June 28, 1960
H. A. CARLSON
2,942,596
AUTOMATIC CHOKE CONTROL
Filed May 21, 1958
4 Sheets-Sheet 1
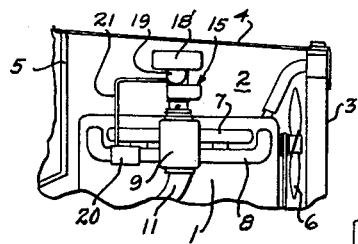
FIG. 1.
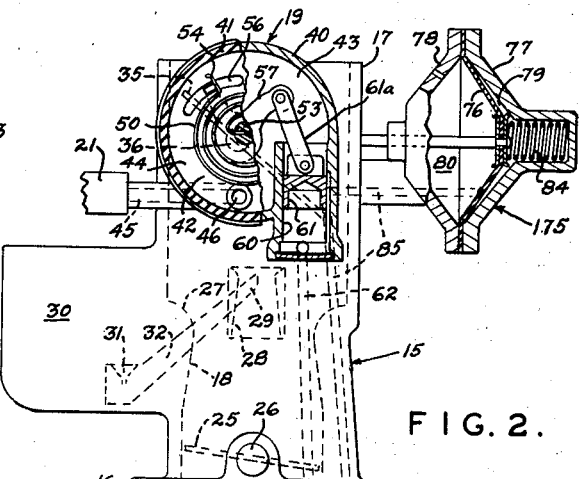
FIG. 2.
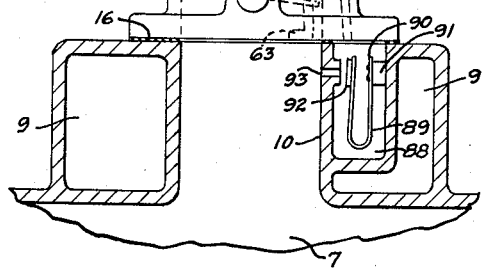
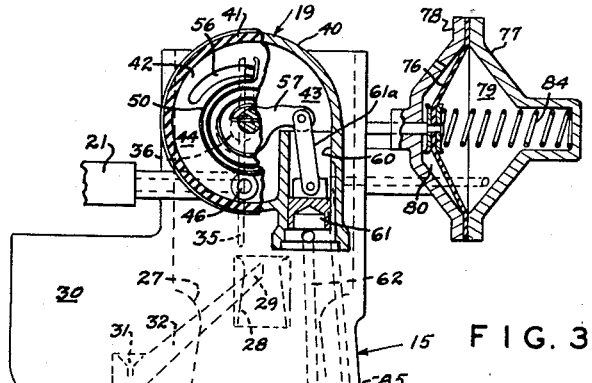
FIG. 3.
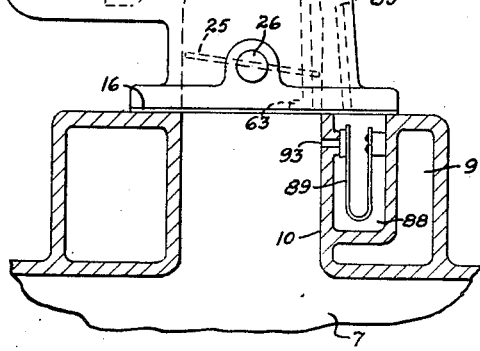
INVENTOR.
HAROLD A. CARLSON
BY
*Laurence M. Goodridge*
ATTORNEY June 28, 1960  H. A. CARLSON  2,942,596
AUTOMATIC CHOKE CONTROL
Filed May 21, 1958  4 Sheets-Sheet 2
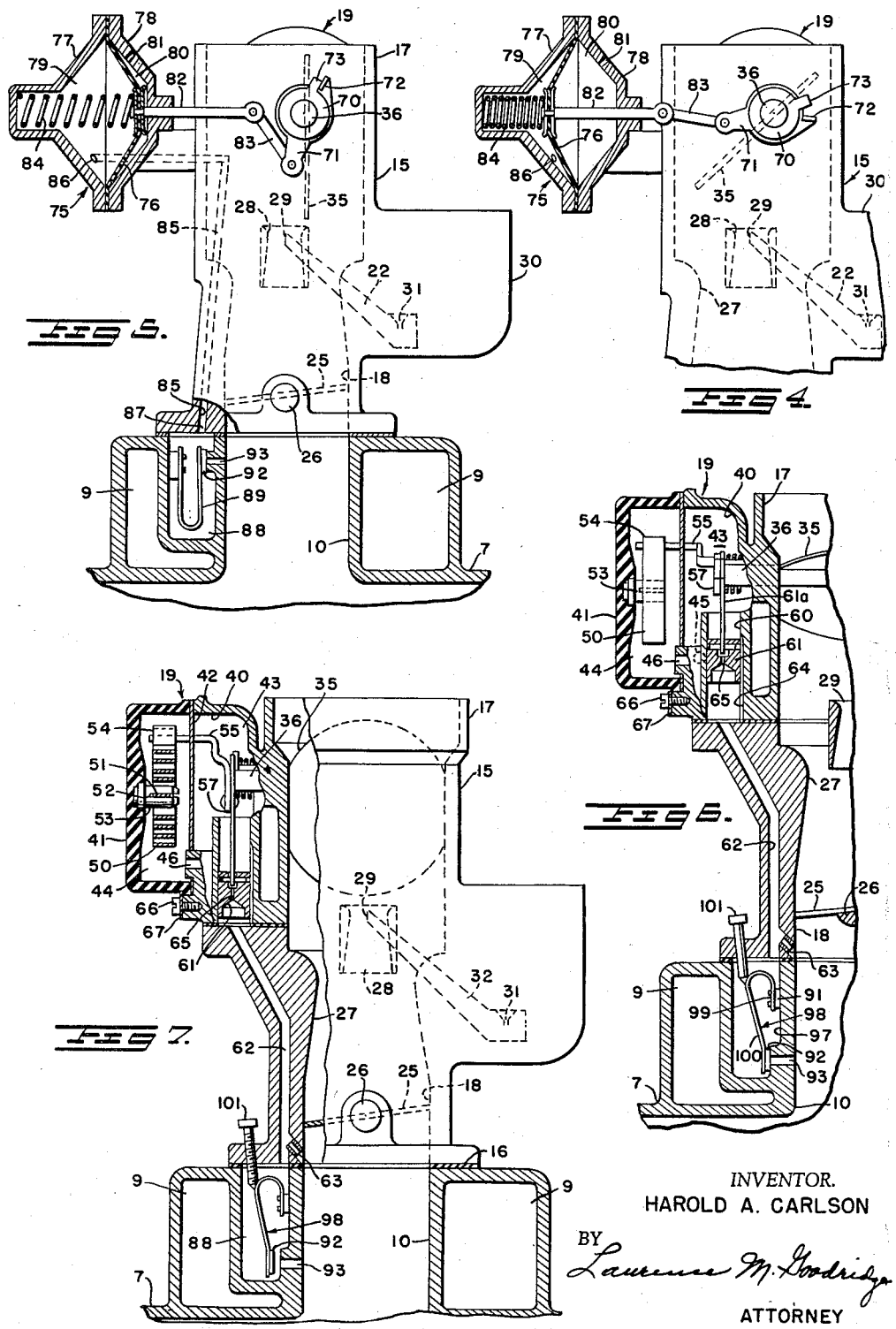
INVENTOR.
HAROLD A. CARLSON
BY
Lawrence M. Goodridge
ATTORNEY June 28, 1960  H. A. CARLSON  2,942,596
AUTOMATIC CHOKE CONTROL Filed May 21, 1958  4 Sheets-Sheet 3

INVENTOR.
HAROLD A. CARLSON
BY
*Laurine M. Goodridge*
ATTORNEY

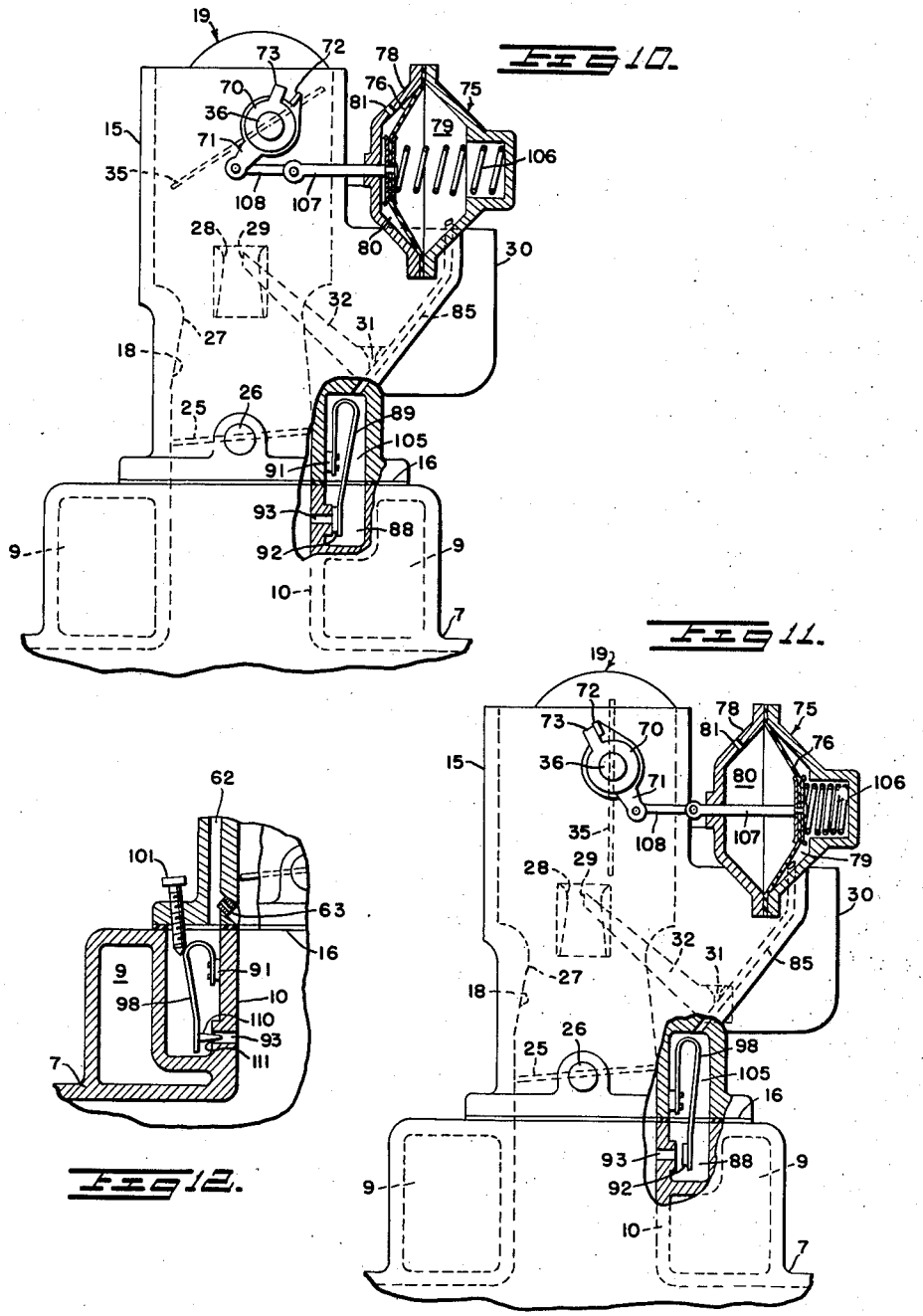

United States Patent Office 2,942,596
Patented June 28, 1960

2,942,596
AUTOMATIC CHOKE CONTROL

Harold A. Carlson, Brentwood, Mo., assignor to ACF Industries, Incorporated, New York, N.Y., a corporation of New Jersey Filed May 21, 1958, Ser. No. 736,903

29 Claims. (Cl. 123—119)

This invention relates to improvements in automatic choke control mechanisms for heat engine fuel systems, such as fuel systems which incorporate carburetors, and more particularly, to a mechanism for more accurately controlling the amount of opening or closing of a choke valve responsive to engine requirements under certain conditions, and is a continuation in part of my pending application Serial No. 557,026, filed January 3, 1956, and now abandoned.

To obtain satisffactory performance from an internal combustion heat engine, it is desirable to decrease the richness of a fuel mixture delivered to the engine as the engine warms up to its normal operating temperature. A device responsive to engine temperature, such as a thermostat, is often utilized to retard opening of the choke valve during the engine warmup period. Under some conditions, the thermostat may be insufficiently responsive to engine temperature to permit the choke valve to open sufficiently for the formation of a proper fuel and air mixture for satisfactory engine performance; for example, when the engine is operating under heavy load with a wide open throttle, when a hot engine is restarted after a short stop (the "coffee stop" problem), and the like, as will be more fully discussed hereinafter.

It is therefore an object of the invention to provide an improved temperature responsive control device.

Another object of this invention is to provide an improved system for automatically compensating for inaccuracies in the response of a temperature responsive control device to an intended heat source.

A further object of this invention is to provide an improved engine temperature responsive control system for more accurately positioning a choke valve of a charge forming system, under certain conditions.

A still further object of this invention is to provide an improved automatic control for a carburetor choke valve wherein cooling of a temperature responsive control element, in excess of that normally responsive to engine temperature, is compensated for to properly position the choke valve for more satisfactory engine performance.

Additional objects and advantages of the invention will be apparent from the following description and drawing in which:

Fig. 1 is an elevation view illustrating an environment of the invention as applied to an automotive engine.

Fig. 2 is an elevation view partially in section, of a carburetor and a portion of an engine manifold system, illustrating an embodiment of the invention, with an associated engine running cold and a cold temperature responsive choke control.

Fig. 3 is an elevation view partially in section, and similar to Fig. 2, but with the associated engine running hot and a cool temperature responsive choke control.

Fig. 4 is an elevation view partially in section, of the opposite side of a portion of the carburetor as illustrated in Fig. 2.

Fig. 5 is an elevation view partially in section, of the opposite side of the carburetor and manifold as illustrated in Fig. 3.

Fig. 6 is an elevation sectional view of a portion of a carburetor and an engine manifold system, and illustrating another embodiment of the invention with an associated cold engine during cranking or while running, and a cool temperature responsive choke control.

Fig. 7 is an elevation view partially in section, and similar to Fig. 6, but with the associated engine hot during cranking or while running and a cool temperature responsive choke control.

Fig. 10 is an elevation view partially in section, of a carburetor and a portion of an engine manifold system, and illustrating another embodiment of the invention as applied to a cold engine and a cold temperature responsive choke control device.

Fig. 11 is an elevation view partially in section, and similar to Fig. 10, but illustrating a hot engine during cranking or during running.

Fig. 12 is an elevation sectional view of a modified form of the invention applicable, in principle, to all the illustrated embodiments.

Figures 8, 9:
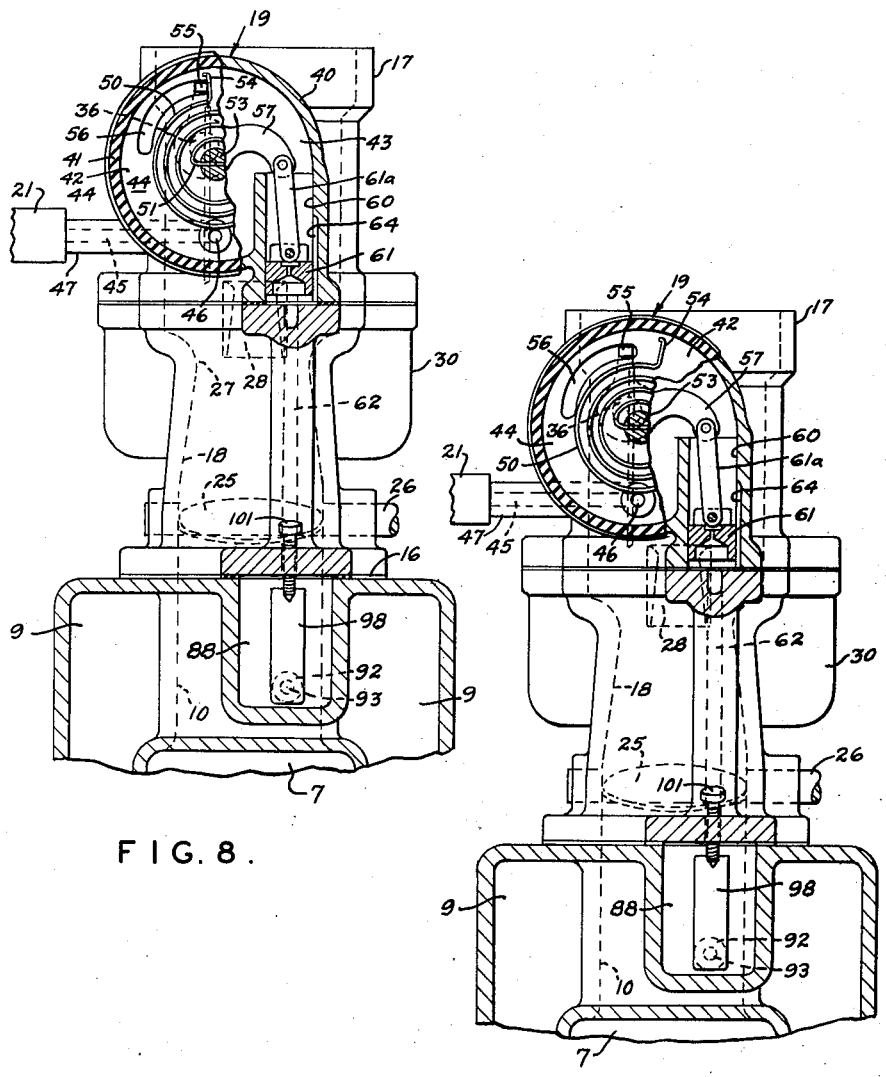
Fig. 8 is an elevation view partially in section, looking in the direction of the arrow in Fig. 7.
Fig. 9 is an elevation view partially in section, and similar to Fig. 8, but with the associated engine hot either during cranking or while running, and with the temperature responsive choke control hot.

Although this invention is applicable to any temperature responsive control device which may respond incorrectly to an intended source of heat because of heat extrinsic to the intended source, it is particularly applicable to the control of a choke valve of a charge forming device such as a carburetor.

For purposes of illustration and description, and without so limiting the invention, the invention is shown as applied to a carburetor choke valve control mechanism. Choke control mechanisms normally include a device tending to urge the choke valve open during operation of the engine, such as a suction motor responsive to engine suction, and a device responsive to engine temperature, such as a thermostat, tending to urge the choke valve closed against the action of the suction motor when the engine is cold, and permitting the choke valve to open progressively as the engine continues to warm up to its normal operating temperature. Such devices may be arranged to act on the choke valve in parallel, in series, or in combinations thereof. Without so limiting the invention, a parallel type choke control device is illustrated and described.

Such temperature responsive choke control devices may fail to properly reflect engine temperature because of a low engine suction failing to draw sufficient engine heat across the temperature responsive device, as may occur, for example, when an engine is operated at wide open throttle under a heavy load. However, the most commonly encountered manifestation of this difficulty is the infamous "coffee stop" problem which may occur when a hot engine is stopped for a short period of time, permitting the temperature responsive choke control device to cool responsive to ambient engine temperature, while the engine temperature is reduced very little. Upon attempting to restart the engine, the resultant excessive closing of the choke valve results in an overly rich fuel mixture which may prevent starting, and which may cause the engine to lope and die after starting.

Throughout the drawings, similar parts are indicated by the same reference numeral.

Referring to Fig. 1, a typical automotive installation includes an engine 1 in a normally vented compartment 2 formed by a cooling system radiator 3, a hood 4, and a firewall or partition 5. Engine ambient air within the compartment 2 is normally heated by engine and radiator heat, and cooled by air outside the compartment. An engine driven fan 6 draws air through the radiator 3 and into the compartment 2. The engine 1 has an intake manifold 7, and exhaust manifold 8 including a heating jacket 9 about a riser 10 of the intake manifold 7 to provide a hot spot, and an exhaust pipe 11. Alternatively, the heating jacket 9 may be heated by engine coolant. A carburetor 15 communicates with the intake manifold 7 through the riser 10 in the heating jacket 9 and is secured to the intake manifold in any conventional manner, as by bolts, with a sealing gasket 16 between the carburetor and the manifold. The carburetor 15 has an air horn 17 to which is secured an air cleaner 18' which draws ambient air in the compartment 2 into mixture conduit 18 in the carburetor. If desired, the air cleaner may draw atmospheric air from outside the compartment. An automatic choke control 19 is attached to the carburetor 1 and is provided with heated air from a stove 20 on the exhaust manifold 8 through a conduit 21. As illustrated throughout the drawings, the automatic choke control 19 is adjacent to the air horn 17 and air cleaner 18', but it may be positioned at any desired location, as adjacent the lower portion of the carburetor 15, or in the exhaust manifold 8.

In all the illustrated modifications, as in the modification illustrated in Figs. 2–5, the carburetor 15 is mounted on the intake manifold 7 and the intake manifold riser 10 communicates with the mixture conduit 18 of the carburetor 15. A throttle valve 25 is fixed to a shaft 26 journaled in the walls of the mixture conduit 18 and may have a conventional linkage (not shown) for manual operation. The carburetor 15 further includes a main venturi 27, a primary venturi 28 with a main fuel nozzle 29 which is supplied with fuel from fuel bowl 30 through jet 31 and main fuel passage 32. An idle fuel system is usually provided, including an idle tube extending downward into the main fuel passage, a conduit system from the upper end of the tube to an idle port adjacent the closed throttle valve and an adjustable port posterior to the closed throttle valve, and a bleed, economizer and bypass, for calibration.

An unbalanced choke valve 35 is fixed to a choke shaft 36 journaled in the walls of the air horn portion 17 of the mixture conduit 18, and a full open stop means (not shown), is normally provided.

The same type of automatic choke control 19 is shown in all of the illustrated modifications, and may best the seen in Figs. 6–9. The position of the parts are shown in the figures under the following conditions: In Fig. 6 with a cold engine and a cold choke control 19, in Figs. 7 and 8 with a hot engine and cold choke control 19, and in Fig. 9 with a hot engine and a hot choke control 19. A generally cup-shaped portion 40 of the carburetor 15 and an insulated housing 41, divided by a baffle plate 42, form chambers 43 and 44, respectively. A passage 45 has an end 46 opening into the chamber 44, and another end 47 in communication with tube 21 which communicates with the stove 20 on exhaust manifold 8 to heat engine ambient air in compartment 2 prior to delivery of the air to the automatic choke control 19. A coil type bimetallic thermostat 50 is contained in the chamber 44 and has an inner end 51 firmly received in a slot 52 in pin 53 fixed to the insulated housing 41, and an outer hook-like end 54 for engaging an arm 55 fixed to an end of the choke shaft 36. The arm 55 projects through a slot 56 in the baffle plate 42. Another arm 57 is also fixed to the choke shaft 36.

A cylinder 60 is provided in the automatic choke control 19, and receives a piston 61, connected to the arm 57 by a link 61a. A suction passage 62 connects the lower portion of the cylinder 60 with the mixture conduit 18 posterior to the closed throttle valve through a calibrated port 63. During operation of the engine, a suction is applied through port 63 and passage 62 to the cylinder 60, drawing the piston 61 into the cylinder and drawing air from engine compartment 2, or any other appropriate source, through exhaust manifold stove 20, tube 21, passage 45, and into the automatic choke control chamber 44, around the thermostat coil 50, through slot 56 into cylinder 60, through one or more slots 64 in the cylinder wall and around the piston 61, and finally through passage 62 and port 63 into the mixture conduit 18. As is best illustrated in Fig. 6, upon starting the engine 1, the piston 61 is drawn into the cylinder 60 until the top peripheral edge of the piston passes the top end of the groove 64, thus effecting the initial opening or pull-off of the choke valve 35. The piston 61 may be provided with a calibrated orifice 65, if desired, to increase the flow of warm air through the automatic choke control. The insulated housing 41 is adjustably clamped to the carburetor cup portion 40 by means of peripherally spaced bolts 66 and plates 67 to facilitate adjusting the force applied by thermostat coil 50 against arm 55. Appropriate cooperating index marks (not shown) may be provided on the cup 40 and the insulated housing 41.

The warm air drawn across the thermostat coil 50 causes the coil to expand, moving the hooked end 54 of the thermostat in a generally clockwise direction, as seen in Figs. 8 and 9, whereupon engine suction applied and the piston 61, and air flow against the unbalanced choke valve 35, causes the choke valve 35 to open progressively as the temperature of the thermostat coil continues to be heated and expand. As the engine, under normal operating conditions, reaches its normal operating temperature, the thermostat coil 50 will have expanded until the hooked end 54 moves clockwise out of engagement with the arm 55, as shown in Fig. 9. The previously described automatic choke control is the widely used Coffey choke control, described in U.S. Patent 2,325,372.

Referring to the modification illustrated in Figs. 2–5, a fixed lever 70 and a freely rotatable lever 71 are mounted on a projecting end of the choke shaft 36 on a side of the carburetor 15 opposite the automatic choke control 19. The rotatable lever has a projecting lug 72 for cooperatingly engaging a lug 73 on the fixed lever 70 to move the fixed lever counterclockwise as viewed in Figs. 4 and 5. Mounted on the side of the carburetor 15 is a suction motor 75 having a flexible diaphragm 76 clamped between housing portions 77 and 78 and defining therewith a suction chamber 79 and an atmospheric chamber 80 having a vent 81. The diaphragm 78 is fixed to a reciprocating stem 82 connected to the rotatable lever 71 by a link 83. Within the suction chamber 79 is a compression spring 84 biased between the housing 77 and the diaphragm 76. A suction passage 85 has a port 86 at one end opening into the suction chamber 79, and another end 87 opening into a pocket 88 adjacent the riser 10 of the intake manifold 7. The pocket 88 is contained within the heating jacket 9 surrounding the riser 10 and communicating with the exhaust manifold 8 to heat the riser and the pocket 88 with hot engine exhaust gases. In this and all other modifications, the heating jacket 9 may be arranged to circulate hot coolant, as engine water.

Within the pocket 88 is a U-shaped thermostat 89 fixed at one end 90 to a protrusion 91 on a wall of the pocket, and carrying a small valve 92 at an opposite end for controlling the flow of air through a suction exit port 93 in the wall of the riser 10. Thermostat 89 and valve 92 are so arranged that when the engine is hot the port 93 is closed, and is open when the engine is cold for applying engine suction in the suction motor suction chamber 79.

The operation of the modification illustrated in Figs. 2–5 is as follows: Figs. 3 and 5 illustrate the position of the parts when the engine is running, stopped, or being cranked during restarting after a "coffee stop," and is hot, but when the coil thermostat 50 has been cooled sufficiently, as by ambient air in compartment 2, or other causes, to normally tend to excessively close the choke valve 35. With the valve 92 closed, the compression spring 84 in the suction chamber 79, acting through the stem 82 and link 83, positions the lug 72 on the rotatable lever 71 against the lug 73 on the fixed lever 70 and holds the choke valve 35 open. The stem 82, link 83, and lever 71 are arranged to provide a mechanical advantage, in the position illustrated in Figs. 3 and 5, so that only a light compression spring 84 is required to maintain the choke valve 35 open against the closing tendency of the cooled coil thermostat 50 in the automatic choke control 19. The coil thermostat 50 must reach a very low temperature to exert a sufficient closing force on the choke shaft 36 to overcome even the light resistance of the compression spring 84. However, by the time this occurs when the engine 1 is stopped, the engine will have cooled sufficiently, under normal conditions, to the point where full action of the automatic choke control 19 is necessary for restarting the engine. When the engine 1 is operating under heavy load with a wide open throttle valve 25, sufficient warm air is normally drawn across the coil thermostat 50 to prevent the thermostat from overcoming the force of spring 84, and merely requires proper calibration of the choke valve control mechanism. Figs. 2 and 4 show the position of the parts after the temperature of the engine 1 has dropped to a point where the automatic choke action 19 is necessary for restarting and proper warmup operation of the engine. At low engine temperatures the U-shaped thermostat 89 and valve 92 opens the suction port 93 and, during cranking of the engine 1 and subsequent warmup operation at lower temperatures, suction is transmitted to the suction chamber 79 causing the diaphragm 76 to compress the compression spring 84, taking the lug 72 on rotatable lever 71 out of engagement with the lug 73 on the fixed lever 70 so that the choke valve 35 can operate normally under the exclusive control of the automatic choke control mechanism 19.

Referring now to the modification illustrated in Figs. 6–9, the manifolding 7, 8, carburetor 1, and automatic choke control 19 are substantially the same as that previously described in so far as they pertain to the invention, and similar parts are designated by the same reference numerals as in the foregoing description. The automatic choke control suction passage 62 opens into the mixture conduit 18 through a calibrated port 45 posterior to the throttle valve 25 in the idle or substantially closed position, as illustrated. The present modification differs from the modification of Figs. 2–5 principally in that the suction motor 75 and connecting linkage (82, 83, and 71) to actuate the choke valve 35 is replaced by the following structure: The suction port 93 in the pocket 88 opens into the riser 10 and is controlled by a valve 92, in much the same manner as in the preceding embodiment. However, in the present embodiment, the valve 92 is controlled by a thermostat 98 which opens the valve when the engine is hot, as illustrated in Figs. 7–9, and closes the valve when the engine is cold, as illustrated in Fig. 6, in lieu of the opposite functioning of the thermostat 89 in the preceding embodiment of Figs. 2–5. As shown in Figs. 6 and 7, the thermostat 98 is U-shaped and has a short leg 99 fixed to a protrusion 9 on the wall 97 of pocket 88, and the valve 92 is secured to the end of another longer leg 100. An adjusting screw 101 is threadably received in the carburetor 1 and engages the bight portion of the U-shaped thermostat 98 to facilitate adjusting the valve 92 to open and close responsive to selected engine temperatures.

The operation of modification illustrated in Figs. 6–9 is as follows: Figs. 7 and 8 show the position of the parts with the engine hot during cranking preparatory to starting the engine, or during operation of the engine when the automatic choke control coil thermostat 50 is sufficiently cooled, as by ambient air in compartment 2, or other causes, so that the choke valve 35 would normally begin to close. When the engine is hot, the thermostat 98 is heated and withdraws the valve 92 from its seat adjacent the suction port 93. The suction port 93 is of very much larger capacity than the fixed suction port 63, thus greatly increasing the suction on the automatic choke control suction piston 61 to permit the piston to fully open the choke valve 35 when the throttle valve 25 is substantially closed.

When the engine is operating under heavy load at wide open throttle, the engine is normally hot and the thermostat valve 92 is open, increasing the suction in the automatic choke suction line 62 to draw additional heated air across the coil thermostat 50 to retard any tendency of the coil thermostat to close the choke valve 35. The increased suction acting on the suction piston because large portion 93 is open, further acts to open the choke valve.

Fig. 9 illustrates the position of the parts with a normally hot engine 1 and automatic choke control 19 during cranking, or running, of the engine. The hook end 54 of the automatic choke thermostat coil 50 has moved completely out of engagement with the choke shaft fixed arm 55, and the choke valve 35 is maintained wide open and prevented from fluttering by suction acting on the piston 61 through both suction ports 63 and 93. Overriding of the choke shaft arm 55 by the thermostat coil hook 54 must be carefully adjusted to function properly throughout the entire range of movement, and cannot normally be sufficiently increased to alleviate excessive closing of the choke out of proportion to engine temperature.

Fig. 6 shows the position of the parts when the engine is at a low temperature, and therefore the automatic choke control thermostat coil 50 is also at a low temperature to properly close the choke valve 35. When the engine is cold, the thermostat valve 92 is closed and engine suction is applied to the automatic choke control suction piston 61 only through the suction port 63 in the carburetor mixture conduit 18. When the suction port 93 is closed, the remaining portions of the choke control mechanism correspond to the conventional Coffey choke control.

In the embodiment illustrated in Figs. 10 and 11, the manifolding 7, 8, carburetor 1, and automatic choke control 19 are substantially as previously described in so far as they pertain to the invention, and, again, similar parts are indicated by the same reference numerals applied in the aforegoing descriptions, and particularly in the modification of Figs. 2–5. The pocket 88 in the heating jacket 9 opens into a second pocket 105 in the carburetor 1. The U-shaped thermostat 98 controls the valve 92 to close the suction port 93 when the engine is cold, and to open the suction port when the engine is hot. When the engine is hot, suction is applied in the suction chamber 79 of the suction motor 75 through the suction passage 85 and suction port 93, drawing the diaphragm 76 into the suction chamber against the resistance of a compression spring 106 engaging the diaphragm 76 and the housing 77. With the parts in the position as shown in Fig. 11, the engine is hot and it is either being cranked preparatory to starting, or it is running. When, with a hot engine and a cool automatic choke control thermostat coil 50 urging the choke valve 35 closed, the auxiliary suction motor linkage between the diaphragm and rotatable lever on the choke shaft (including a stem 107 fixed to diaphragm 76 and link 108), causes the lug 72 on the rotatable lever 71 to move counterclockwise into engagement with the lug 73 on the fixed choke shaft lever 70, rotating the choke valve 35 to the open position. When the engine is cold, as shown in Fig. 10, normal operation of the automatic choke control is generally desired, and the thermostat valve 92 closes the suction port 93 permitting the coil spring 106 to move the diaphragm 76 into the atmospheric chamber 80, whereupon the linkage 107, 108 rotates the lever 71 clockwise and the lug 72 out of engagement with the lug 73 on the choke shaft fixed lever 70. Therefore, upon starting a cold engine, the automatic choke control 19 functions in the normal manner with the suction piston 61 effecting the initial opening or pull-off of the choke valve 35 and the thermostat coil 50 resisting such opening.

In the modifications of Figs. 6–9, and 10 and 11, with a dead engine, the choke valve 35 can close as the automatic choke control thermostat coil 50 cools because of the absence of suction in the cylinder 60, and suction chamber 79 in Figs. 10 and 11, and the choke valve 35 will remain closed, or partially closed, until the engine is cranked preparatory to starting and a suction is applied to the piston 61, and suction chamber 79 in Figs. 10 and 11, so that the thermostat coil 50 is not under excessive load with a cold, inoperative engine.

Fig. 12 illustrates an embodiment for use in lieu of the thermostat valve 92, which is applicable to all embodiments. For purposes of description, reference is made to the modification of Figs. 6–9. In lieu of the more or less "on and off" valve 92, a calibrated metering valve 110 on thermostat 98 and a valve seat 111 in port 93, shown slightly open, meter the suction applied to piston 61 during warming up of the engine 1. Therefore, the choke valve 35 will not abruptly open when the thermostat coil is cooler than a warm but not hot engine. When the metering valve 110 is applied to the embodiments of Figs. 2–5 and Figs. 10 and 11, the suction chambers 79 of the suction motors 75 must be provided with an atmospheric vent, as vent 81, calibrated along with the metering valve 110 and port 93.

The automatic choke control 19, and especially thermostat coil 50, may be positioned at any desired location near the carburetor, and by providing a thermostat valve actuator, as 89 or 98, which is more rapidly responsive to changes in engine temperature than the coil thermostat 50, undesirable closing of the choke valve will be avoided.

Although this invention has been described with reference to several embodiments, details and operable relationships, various changes will be apparent to one skilled in the art, and the invention therefore is not to be limited to such embodiments, details or operable relationships except as set forth in the appended claims.

I claim:

1. An automatic choke mechanism for an engine carburetor having a mixture conduit and a throttle for controlling the flow of mixture through said conduit to the engine, said choke mechanism comprising a choke valve adapted to be positioned in said mixture conduit, a temperature responsive means for moving said choke valve toward a closed position at low temperature, suction responsive means to move said valve in an opening direction, and a spring means active after the engine stops to yieldably resist the closing of said valve by said temperature responsive means.

2. An automatic choke mechanism for an engine carburetor having a mixture conduit and a throttle for controlling the flow of mixture through said conduit to the engine, said choke mechanism comprising a choke valve adapted to be positioned in said mixture conduit, a temperature responsive means to move said valve toward closed position at low temperatures, means adapted to be actuated by suction to urge said choke valve in an opening direction during engine operation, an engine temperature controlled means to vary the opening force exerted on said choke valve when the engine is cranked.

3. The combination defined in claim 2 in which said engine temperature controlled means includes a suction motor.

4. The combination defined in claim 2, in which said engine temperature controlled means includes structure for varying the suction applied to said means adapted to be actuated by suction.

5. An engine carburetor comprising a mixture conduit, a throttle for controlling the flow of mixture through said conduit, a choke valve positioned in said mixture conduit, a temperature responsive thermostatic spring to move said choke valve toward a closed position at low temperatures, means forming a passage extending adjacent to said thermostat spring for heating said thermostat spring during engine operation, a first suction motor connected to said choke valve and adapte to be actuated by engine suction tending to urge said valve in an opening direction, and means including a spring acting on said choke valve in a direction opposing the closing action of said thremostat spring at low temperature, a second suction motor means connected to said choke valve and responsive to suction to act in opposition to said spring means, said second suction motor means including an engine temperature responsive control valve for controlling the application of suction to said second suction motor means.

6. An engine carburetor comprising means forming a mixture conduit, a throttle for controlling the flow of mixture through said conduit to an engine, a choke valve in said mixture conduit, a temperature responsive means for moving said choke valve toward a closed position at low temperature, means for supplying heat from said engine to said temperature responsive means during engine operation, means actuated by suction for urging said valve in an opening direction, means including a spring acting on said choke valve in opposition to said temperature responsive means, a suction motor to oppose the action of said spring, an engine temperature responsive means for rendering said suction motor operative when engine is cold.

7. An engine carburetor comprising a mixture conduit, a throttle for controlling the flow of mixture through said conduit to an engine, a choke valve in said mixture conduit, a temperature responsive means for moving said choke valve toward a closed position at low temperature, means for supplying heat to said temperature responsive means during engine operation, motor means connected to said choke valve and operative to oppose the choke valve closing tendency of said temperature responsive means, and an engine temperature responsive means controlling the operation of said motor means by rendering said motor means operative at high engine temperatures.

8. A carburetor comprising means forming a mixture conduit for supplying fuel to an intake manifold for an internal combustion engine, a choke valve in said mixture conduit, means responsive to temperature for closing said choke valve, motor means to apply a force to said choke valve to urge said choke valve toward open position during engine operation against the closing action of said temperature responsive means, and an engine temperature controlled means to vary the force exerted by said motor means.

9. A carburetor for an internal combustion engine comprising a mixture conduit adapted to connect to an intake manifold of said engine, a choke valve positioned in said mixture conduit, a thermostat spring connected to said choke valve and responsive to variations in temperature to operate said choke valve, a suction motor connected to said choke valve to apply a force urging said choke valve against the action of said thermostat spring, means forming a suction passage adapted to lead from the intake manifold of said engine and connected to said suction motor, a valve in said passage, and a thermostat controlling said valve.

10. An internal combustion engine comprising an intake manifold, a carburetor including a mixture conduit for supply fuel to said intake manifold, a choke valve in said mixture conduit, a thermostat spring responsive to variations in temperature to close said choke valve, a suction motor responsive to engine suction to apply a force urging said choke valve toward open position during engine operation against the action of said thermostat spring, a suction passage leading from said intake manifold to said suction motor, a valve in said passage, and a connector to said valve controlling said valve, said intake manifold including a hot air chamber enclosing said thermostat.

11. An automatic choke mechanism for an internal combustion engine having a carburetor for supplying fuel through a mixture conduit to an intake manifold of said engine, said choke mechanism comprising a choke valve adapted to be positioned in said mixture conduit, means responsive to variations in temperature to close said choke valve, means responsive to suction to apply a force urging said choke valve toward open position during engine operation, and an engine temperature controlled means tending to vary the force exerted by said suction responsive means.

12. An automatic control for a heat engine comprising a first means responsive to engine temperature and a second means responsive to ambient temperature, and means to compensate for a response of said second means to said ambient temperature to render said control more nearly responsive to said engine temperature.

13. A carburetor comprising means forming a mixture conduit for the flow of a fuel mixture through said conduit to an engine, an adjustable choke valve in said mixture conduit, a choke valve control means responsive to engine temperature to urge said choke valve closed when said valve control means are cold, and engine temperature controlled means to resist closing movement of said choke valve by said choke valve control means when the temperature of said choke valve control means is less than that normally corresponding to the temperature of a hot engine.

14. An automatic choke mechanism for a carburetor having a mixture conduit for the flow of a fuel mixture through said conduit to an engine, said choke mechanism comprising, an adjustable choke valve adapted to be positioned in said mixture conduit, first means normally responsive to engine temperature and tending to move said valve toward a closed position when said first means is at a relatively low temperature, and second means responsive to said engine temperature and tending to resist the closing action of said first means.

15. A carburetor device comprising structure forming a mixture conduit for the flow of a fuel mixture therethrough to an engine, an adjustable choke valve in said mixture conduit, first means normally responsive to engine temperature for moving said valve toward a closed position when said first means is at a relatively low temperature, and second means responsive to said engine temperature to resist the closing action of said means to compensate for excessive closing of said choke valve when said first means cools below a point at which said first means is normally responsive to engine temperature.

16. A carburetor device comprising structure forming mixture conduit for the flow of a fuel mixture therethrough to an engine, an adjustable choke valve in said mixture conduit, first means normally responsive to engine temperature for moving said valve toward a closed position when said means is at a relatively low temperature, second means for urging said valve in an opening direction when said engine is operating, and third means responsive to said engine temperature to resist the closing action of said first means to compensate for excessive closing of said choke valve when said first means cools below a point at which said fuel means is normally responsive to engine temperature.

17. In the carburetor device of claim 16, said third means including a suction actuated device.

18. A carburetor device comprising structure forming a mixture conduit for the flow of a fuel mixture therethrough to an engine, an adjustable choke valve in said mixture conduit, means normally responsive to engine temperature to move said choke valve toward closed position when said means is at a relatively low temperature, means responsive to engine suction for urging said valve in an open direction against the choke valve closing action tendency of said means when said engine is operating, and means to resist the closing action of said first means when said engine is at a relatively high temperature.

19. In the carburetor device of claim 18, said last means including a resilient structure.

20. In the carburetor device of claim 18, said last means including structure responsive to engine suction.

21. In the carburetor device of claim 18, said last means including structure for varying the suction acting on said said suction actuating means.

22. An internal combustion heat engine comprising a carburetor having a mixture conduit for the flow of fuel to said engine, an adjustable choke valve, engine temperature responsive means for urging said choke valve closed, and means to retard excessive closing of said choke valve by said temperature responsive means during restarting when said engine is hot.

23. An internal combustion heat engine comprising a fuel-air mixture system, including an adjustable valve for controlling said mixture, first means normally responsive both to ambient temperature and to engine temperature for urging said valve closed when said engine is cold and for permitting said valve to open progressively as the temperature of said engine increases, a second means including a source of engine heat and directly responsive to engine temperature, and means interconnecting said second means and said valve to prevent said valve from assuming an excessively closed position responsive to cooling of said first means by ambient temperature as said engine is started while hot.

24. An automatic choke control mechanism for an engine, said mechanism including a carburetor having a mixture conduit for the flow of a fuel-air mixture therethrough to the engine, an adjustable choke valve in said mixture conduit, a first thermostat connected to said choke valve and responsive to ambient temperature to vary the position of said choke valve forming a conduit having one end thereof adjacent to said first thermostat for conducting air heated by said engine to said first thermostat when said engine is operating, a second thermostat responsive to engine temperature alone, and means controlled by said second thermostat means to oppose any response of the first said thermostat to cold ambient temperature upon restarting a hot engine.

25. A carburetor comprising a mixture conduit for the flow of a fuel mixture therethrough to an engine, an adjustable choke valve in said mixture conduit, first means normally responsive to ambient and to engine temperatures for urging said choke valve toward a closed position when said first means is at a relatively low temperature, and second means responsive to engine warm up temperatures for resisting the closing action of said first means when said first means is cooled by ambient temperature below a point at which said first means would be responsive to engine temperature.

26. A carburetor having a mixture conduit for the flow of a fuel mixture there-through to an engine, an adjustable choke valve in said mixture conduit, first means normally responsive to engine temperature to move said valve toward closed position when said first means is at a relative low temperature, means responsive to engine suction to urge said valve in an open direction against the closing action of said first means when said engine is operating, and second means responsive to engine temperature to resist the closing tendency of said first means in proportion to engine temperature when said engine is in the warmup temperature range.

27. A carburetor comprising a throttle and a choke valve, temperature responsive means for yieldingly urging said valve toward closed position and rendered inoperative at high temperatures, means responsive to suction posterior to said throttle for moving the valve toward open position against the force of said temperature responsive means, and means whereby said choke valve will be moved to its full open position when said engine is relatively hot and said temperature responsive means is relatively cool.

28. A carburetor comprising a throttle and a choke valve, temperature responsive means for yieldingly urging the valve toward closed position and rendered inoperative at high temperatures, means responsive to suction posterior to said throttle for moving the valve toward open position against the force of said temperature responsive means, and means whereby said choke valve will be moved to its full open position irrespective of said temperature responsive means when said engine is relatively hot.

29. A carburetor comprising a throttle and a choke valve, temperature responsive means for yieldingly urging the valve toward closed position and rendered inoperative at high temperature, means responsive to suction posterior to said throttle for moving the valve toward open position against the force of said temperature responsive means, and means whereby said choke valve will be moved to its full open position irrespective of said temperature responsive means when said engine is relatively hot and said temperature responsive means is relatively cool.

References Cited in the file of this patent

UNITED STATES PATENTS 2,511,318  Beard ------------------ June 13, 1950